United States Patent
Parish et al.

[15] 3,637,459

[45] Jan. 25, 1972

[54] STRUCTURAL PANEL HAVING FOAM PLASTIC CORE

[72] Inventors: Hal G. Parish; Albert J. Palfrey; Eugene R. Moore, all of Midland, Mich.

[73] Assignee: The Dow Chemical Company, Midland, Mich.

[22] Filed: Mar. 17, 1970

[21] Appl. No.: 20,316

[52] U.S. Cl. ............................161/161, 161/165, 161/186, 161/227, 161/252, 161/253, 161/254
[51] Int. Cl. ................B32b 3/26, B32b 27/06, B32b 31/04
[58] Field of Search................161/160, 161, 165, 186, 227, 161/253, 254, 252

[56] References Cited

UNITED STATES PATENTS

| | | | |
|---|---|---|---|
| 3,411,967 | 11/1968 | Rowland et al. | 161/161 |
| 3,492,196 | 1/1970 | Moore | 161/160 |
| 3,499,819 | 3/1970 | Lewis | 161/216 |

Primary Examiner—William J. Van Balen
Attorney—Griswold & Burdick, Richard G. Waterman and Robert B. Ingraham

[57] ABSTRACT

Laminated panels of improved stability and wide utility are obtained by employing a styrene-maleic anhydride copolymer as a foamed core of the panel. The copolymer is a uniform copolymer of from 85 to 65 weight percent styrene and 15 to 35 weight percent maleic anhydride.

5 Claims, 1 Drawing Figure

PATENTED JAN 25 1972
3,637,459
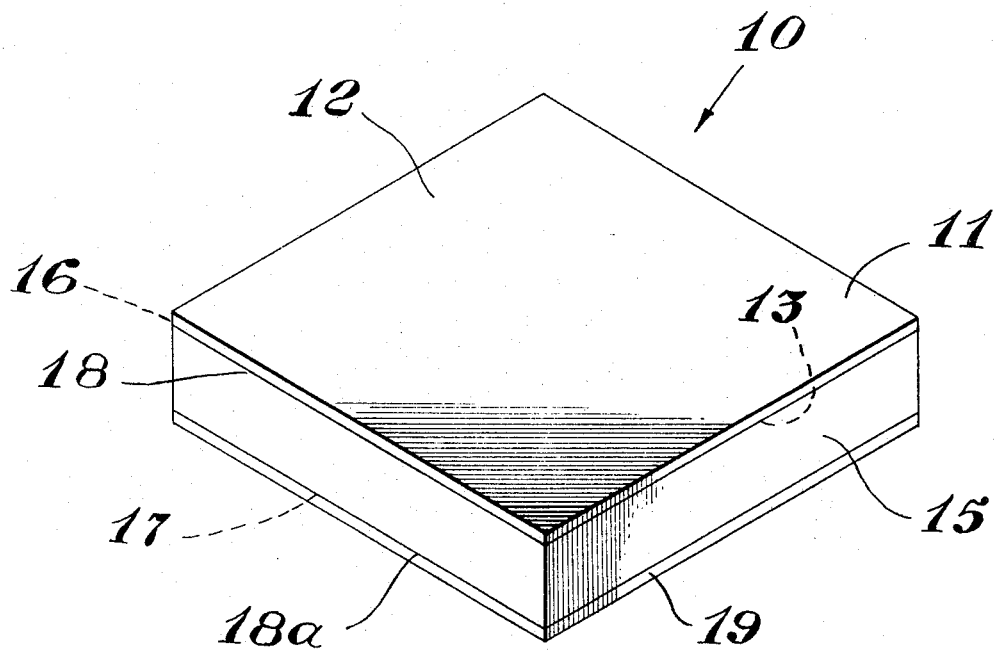
INVENTORS.
Hal G. Parish
Albert J. Palfey
Eugene R. Moore
BY Robert B. Ingraham
AGENT

STRUCTURAL PANEL HAVING FOAM PLASTIC CORE

Prefabricated panels for structural and insulating purposes have found wide application. Many varieties of such panels have been prepared, and for a wide utility desirably such a panel should be moisture insensitive, resist subzero temperatures such as might be encountered in freezing lockers, low-temperature storage and like installations, and yet, the same materials should be able to withstand moist warm conditions such as are encountered when low-temperature storage space is defrosted and cleaned with steam. Some structural insulating panels are paper honeycomb which has excellent insulation properties at elevated temperatures under relatively moisture-free conditions. However, they are susceptible to degradation under moist conditions; they are heavy, difficult to fabricate and insulating properties are relatively poor compared to foam plastics. Phenolic foams are lightweight and have excellent thermal stability, but have low physical strength and are susceptible to attack by moisture. Polyurethane foam is light in weight and has excellent insulating properties, less than desired thermal stability, marginal physical strength and marginal moisture resistance. Polystyrene foam is light in weight, has excellent insulating properties and moisture resistance; its application, however, is limited to maximum temperatures of about 170° F. because of this low heat distortion temperature. Polystyrene foam is also readily attacked by many organic solvents used in adhesives which are otherwise desirable as laminating or bonding agents.

It would be desirable if there were available an improved laminated panel wherein at least the core of the material was relatively insensitive to moisture over a wide temperature range, the core being of low density, high insulating value, good physical strength under both moist and dry conditions.

These features and other advantages in accordance with the present invention are achieved in a structural panel, the structural panel having a foamed core, the foamed core having first and second major surfaces and edge portions, the structural panel having at least a first skin member of substantially higher density than the core, and the skin member being rigidly affixed to the first face of the core, the improvement which comprises the core being of a copolymer of styrene and maleic anhydride containing chemically combined therein from about 85 to 65 weight percent styrene and from 15 to 35 weight percent maleic anhydride, the core having a flexural strength of from about 60 to 110 pounds per square inch, the polymer having a solution viscosity of from about 3 to 12 centipoise (viscosity of a 10 weight percent solution of polymer in methylethylketone at 25° C.), and beneficially a viscosity of from about 3 to 9 centipoise.

Further features and advantages of the present invention will become more apparent from the following specification taken in connection with the drawing wherein the FIGURE depicts a panel in accordance with the invention generally designated by the reference numeral 10.

The panel 10 has a first skin member 11, the skin member 11 having a first major surface 12 and a second major surface 13. The skin member 11 is disposed adjacent to a core 15 having a first major surface 16 and a second major surface 17. The surface 16 of the core 15 is adhered to the surface 13 of the skin 11 by means of an adhesive layer 18. A second skin member 19 is disposed generally adjacent the second surface 17 of the core 15 and is adhered thereto by means of an adhesive layer 18a. The skins 11 and 19 and the core 15 have major surfaces of generally like dimension.

A wide variety of adhesive materials may be employed to bond the skins to the foam plastic core. Such adhesive are well known in the art and need not further be discussed. Such adhesives may be of the solvent variety such as a solution of polybutadiene rubber in heptane of the curing variety such as epoxy resins, evaporative resins such as polyvinyl acetate, hotmelt adhesives such as copolymers of ethylene acrylic acid, hardenable phenolic resins and the like.

A wide variety of materials may be employed for skins or faces on the panels, including plywood; wood veneer; metals such as aluminum, stainless steel, copper; synthetic resinous materials such as fiberboard, for example, tempered and untempered hardboard; glass-reinforced plastic compositions such as glass fiber reinforced polyester compositions, glass fiber reinforced resins, glass fiber reinforced epoxy vinyl ester resins; thermoplastics such as polyvinyl chloride, nylon, and plastic metal laminates and the like.

It is essential and critical to the practice of the present invention that the plastic or synthetic resinous foam employed to be a copolymer of from about 85 to 65 weight percent styrene and from about 15 to 35 weight percent maleic anhydride. The polymeric mixture obtained by the batch polymerization of a mixture of monomer within the above mentioned range does not come within the scope of the present invention. For example: if styrene-maleic anhydride is batch polymerized employing 3 moles of styrene and 1 mole of maleic anhydride, the resultant product is a mixture of polystyrene roughly 2 parts by weight and 2 parts by weight of a 1:1-mole-ratio copolymer of styrene and maleic anhydride. Such a polymer is not suitable for practice of the present invention.

The present invention requires the use of the so-called uniform copolymers; that is, random polymers of styrene and maleic anhydride. One method of making such a uniform polymer is disclosed in U.S. pat. No. 2,769,804, issued Nov. 6, 1956, to A. W. Hanson, which is herewith incorporated in its entirety by reference. It is essential that the solution viscosity of the polymer be between from about 3 to about 12 centipoise, the solution viscosity being the viscosity of a 10 weight percent solution of the uniform composition copolymer in methylethylketone at 25° C. The solution viscosity is somewhat indicative of molecular weight which can be controlled by polymerization temperature, catalyst concentration and like means well known to the art. The polymer solution is readily prepared by processes well known to the art, beneficially, heat plastification of the polymer admixture with suitable blowing agent such as dichlorodifluoromethane and extrusion into the desired form. One of many ways in which foam may be beneficially prepared from such a polymer is set forth in U.S. Pat. No. 2,740,157, issued Apr. 3, 1956, to J. L. McCurdy and C. E. DeLong, herewith incorporated in its entirety by reference thereto. During the process of extrusion or preparation of the foam, the solution viscosity of the polymer may be lowered due to degradation during the processing. It should be emphasized that the polymer viscosity referred to herein is the viscosity of the polymer in the foam and not necessarily the polymer viscosity employed to form the foam. (The solution viscosity of the resin is reduced by extrusion or hot-working generally in proportion to the temperature and shear conditions.) Most advantageously, foams for use in the present invention are prepared to provide foam having a polymer solution viscosity of from about 3 to 9 centipoise.

Panels in accordance with the present invention are readily prepared employing conventional fabricating techniques. Usually, a suitable adhesive is applied to a face of the core, a skin member or to both and the surfaces to be joined placed in contact and the adhesive cured. Such adhesives may be applied by any suitable means, depending upon the form of the adhesive. If a liquid adhesive is employed, brushing, rolling, dipping, spraying and the like are generally satisfactory. Solid film adhesives such as hotmelt adhesives may be applied as a dry preformed film or extruded as a hotmelt. Curing or solidification of the adhesive, depending upon its nature, may be readily accomplished by aging at room temperature, dielectric heating, heating in a platen press or any other technique convenient to the particular adhesive being employed.

By way of further illustration, a plurality of constant composition styrene-maleic anhydride copolymers are prepared employing the method and apparatus of the Hanson patent hereinbefore mentioned. The copolymers are then foamed employing a 2.5-inch extruder and an extrusion rate of 100 pounds per hour and a blowing agent of about 80 parts by weight methyl chloride and 20 parts by weight dichlorodifluoromethane which is pumped into the extruder at a location between the feed port and the die using an arrangement substantially similar to that shown in the hereinbefore referred to McCurdy, et al. patent. The various styrene-maleic anhydride constant composition copolymers are extruded to provide a density of about 2.3 pounds per cubic foot. Samples of the polymers are taken before and after extrusion. The temperature which the material reached in the extruder is set forth in table I under the heading "Gel Temperature Extruder," and the temperature of the gel just prior to extrusion from the die is shown in the column headed "Gel Temperature Cooler." The polymers were prepared to provide samples having roughly comparable solution viscosities.

TABLE I

Degradation of 8 centipoise solution viscosity of styrene-maleic anhydride copolymer in extrusion process

| Sample No. | Maleic anhydride content, weight percent | Gel temperature, °C. | | Solution viscosity in centipoise | |
|---|---|---|---|---|---|
| | | Extruder | Cooler | Before extrusion | After extrusion |
| 1 | 0 | 200 | 120 | | |
| 2 | 10 | 208 | 135 | 8.00 | 7.89 |
| 3 | 15 | 220 | 149 | 8.02 | 7.88 |
| 4 | 25 | 235 | 180 | 7.99 | 7.81 |
| 5 | 30 | 258 | 193 | 7.91 | 7.60 |
| 6 | 35 | 274 | 207 | 8.08 | 3.9 |
| 7 | 40 | 290 | 220 | 8.05 | a 2.80 |
| 8 | 48 | 308 | 246 | 8.10 | 2.20 | a Foam too weak.

A plurality of panels are prepared from the foregoing samples, the panels are 1 inch thick, 12 inches long and 3 inches wide. A plurality of skins of sheet aluminum having a thickness of 30 mils are prepared, each having a length of 12 inches and a width of 3 inches. The aluminum sheets are cleaned by vapor degreasing. An epoxy resin adhesive is employed which is prepared by admixing 100 parts of Epoxy Resin DER-331 (Dow, condensation product of epichlorohydrin and diglycidylether of Bisphenol A and having about 190 epoxy equivalent weight) with 25 parts of Versamid 140 (General Mills, a polyamide curing agent prepared from dilinoleic and ethylene diamine, having an amine value of 375 and a specific gravity (25° C./25° C.) of 0.97.) The adhesive is applied to the sheet aluminum skins at a coating weight of 20 grams per square foot. A skin is applied to each face of the 12×3×1-inch boards in this manner and the resultant laminates placed under a pressure of about 6 pounds per square inch and cured at 78° F. for about 4 hours.

Similar panels are prepared employing cores of polystyrene and polyurethane and a commercially available paper honeycomb core. The dry flexural rigidity of these samples is tested under the following conditions: a panel sample is placed on supports 10 inches apart in a tensile and compression testing machine having an oven chamber. A 50-pound ¼-point load (3 inches from the end) is applied at a rate of 50 mils per minute and the center deflection measured as set forth in the American Society for Testing Materials Method C-393. The temperature is then increased by 20° F. and again the 50-pound ¼-point load is applied and the deflection measured. This procedure is repeated until the deflection in the panel exceeds 0.75 mil. When a temperature is reached at which the deflection exceeds 0.75 mil, the panel is considered to fail (F) the test, whereas if the deflection is less than 0.75 mil, the panel is considered to have passed the test (P). The results are set forth in table II.

TABLE II.—FAILURE TEMPERATURE OF DRY PANELS

| Foam core material | Failure temperature (° F.) | | | | | | | | | | |
|---|---|---|---|---|---|---|---|---|---|---|---|
| | 180 | 190 | 200 | 210 | 220 | 230 | 244 | 250 | 260 | 270 | 280 |
| Polystyrene | F | | | | | | | | | | |
| Styrene-maleic anhydride: | | | | | | | | | | | |
| 5% maleic anhydride | P | P | F | | | | | | | | |
| 10% maleic anhydride | P | P | P | F | | | | | | | |
| 15% maleic anhydride | P | P | P | P | F | | | | | | |
| 25% maleic anhydride | P | P | P | P | P | P | P | P | P | P | F |
| 30% maleic anhydride | P | P | P | P | P | P | P | P | P | P | P |
| 35% maleic anhydride | P | P | P | P | P | P | P | P | P | P | P |
| 40% maleic anhydride | P | P | P | P | P | P | P | P | P | P | P |
| 48% maleic anhydride | P | P | P | P | P | P | P | P | P | P | P |
| Polyurethane | P | P | P | F | | | | | | | |
| Paper honeycomb | P | P | P | P | P | P | P | P | P | P | P |

A second series of panels is prepared and tested as hereinbefore described with the exception that they are aged in an oven for 40 days at 100 percent relative humidity and a temperature of 120° F. The sides of the core materials are exposed to the oven atmosphere. The results are set forth in table III.

TABLE III.—FAILURE TEMPERATURE OF PANELS EXPOSED TO HUMID CONDITIONS

| Foam core material | Failure temperature (° F.) | | | | | | | | | | |
|---|---|---|---|---|---|---|---|---|---|---|---|
| | 180 | 190 | 200 | 210 | 220 | 230 | 240 | 250 | 260 | 270 | 280 |
| Polystyrene | F | | | | | | | | | | |
| Styrene-maleic anhydride: | | | | | | | | | | | |
| 5% maleic anhydride | P | F | | | | | | | | | |
| 10% maleic anhydride | P | P | F | | | | | | | | |
| 15% maleic anhydride | P | P | P | F | | | | | | | |
| 25% maleic anhydride | P | P | P | P | P | P | P | P | F | | |
| 30% maleic anhydride | P | P | P | P | P | P | P | P | P | F | |
| 35% maleic anhydride | P | P | P | P | P | P | P | P | F | | |
| 40% maleic anhydride | P | P | P | P | F | | | | | | |
| 48% maleic anhydride | P | P | F | | | | | | | | |
| Polyurethane | P | | | | | | | | | | |
| Paper honeycomb | P | | | | | | | | | | |

A further group of panels is prepared as hereinbefore described with the exception that after the aluminum skins are adhered thereto, ⅛-inch holes are drilled through the aluminum and into the core. The ⅛-inch holes are in a square pattern on 2-inch centers and are exposed to Southern Florida weather conditions for a 3-month period. During this time the relative humidity varies from 80 to 100 percent and ambient temperatures vary from 80° to 105° F. Thermocouples are disposed within the panels and maximum temperatures approaching 200° F. are observed. Following the exposure period, the samples are tested for flexural strength as hereinbefore described and the results set forth in table IV.

In a manner similar to the foregoing illustrations, eminently satisfactory structural panels are prepared of the hereinbefore described styrene-maleic anhydride copolymer foam employing a wide variety of facing sheets.

As is apparent from the foregoing specification, the present invention is susceptible of being embodied with various alterations and modifications which may differ particularly from those that have been described in the preceding specification

TABLE IV.—FAILURE TEMPERATURE OF PANELS EXPOSED TO ATMOSPHERIC CONDITIONS

| Foam core material | Failure temperature (° F.) | | | | | | | | | |
|---|---|---|---|---|---|---|---|---|---|---|
| | 180 | 190 | 200 | 210 | 220 | 230 | 240 | 250 | 260 | 270 |
| Polystyrene | F | | | | | | | | | |
| Styrene-maleic anhydride: | | | | | | | | | | |
| 5% maleic anhydride | F | | | | | | | | | |
| 10% maleic anhydride | P | F | | | | | | | | |
| 15% maleic anhydride | P | P | P | P | F | | | | | |
| 25% maleic anhydride | P | P | P | P | P | P | P | P | P | F |
| 30% maleic anhydride | P | P | P | P | P | P | P | P | F | |
| 35% maleic anhydride | P | P | P | P | P | P | F | | | |
| 40% maleic anhydride | P | P | P | F | | | | | | |
| 48% maleic anhydride | P | P | F | | | | | | | |
| Polyurethane | P | F | | | | | | | | |
| Paper honeycomb | F | | | | | | | | | |

A plurality of foam billets are prepared of styrene-maleic anhydride copolymers of uniform composition containing about 25 weight percent maleic anhydride and 75 weight percent styrene. The solution viscosity of the copolymers and densities of the foam varies. Flexural strength of samples of the foam billets is determined by ASTM Method DC 203–58. The results are set forth in table V.

TABLE V

Flexural Strength of Foams Produced from 25% Maleic Anhydride Copolymers

| Pounds per Cubic Foot ±0.015 | Centipoise per Square Inch | | | |
|---|---|---|---|---|
| | 2 | 4 | 8 | 12 |
| 2.0 | 26 | 58 | 79 | 85 |
| 2.5 | 45 | 99 | 126 | 136 |
| 3.0 | 62 | 137 | 164 | 182 |
| 3.5 | 76 | 170 | 208 | 221 |
| 4.0 | 103 | 214 | 247 | 259 |

It is desirable that the solution viscosity of the foam in the polymers employed for panels of the present invention be from about 3 to 12 centipoise, and preferably in the range of from about 3 to 9 centipoise.

and description. For this reason, it is to be fully understood that all of the foregoing is intended to be merely illustrative and is not to be construed or interpreted as being restrictive or otherwise limiting of the present invention.

What is claimed is:

1. A structural panel, the structural panel having a foamed core, the foamed core having first and second major surfaces and edge portions, the structural panel having at least a first skin member of substantially higher density than the core, and the skin member being rigidly affixed to the first face of the core, the improvement which comprises
the core being of a copolymer of styrene and maleic anhydride containing chemically combined therein from about 85 to 65 weight percent styrene and from 15 to 35 weight percent maleic anhydride,
the core having a flexural strength of from about 60 to 110 pounds per square inch, and
the polymer having a solution viscosity of from about 3 to 12 centipoise.

2. The panel of claim 1 wherein the second face of the core has a second skin member rigidly affixed thereto.

3. The panel of claim 1 wherein the skin member is a metal sheet.

4. The panel of claim 1 wherein the solution viscosity of the polymer is from 3 to 9 centipoise.

5. The panel of claim 1 wherein the panel is adhesively bonded to the core.

* * * * *

UNITED STATES PATENT OFFICE
CERTIFICATE OF CORRECTION

Patent No. 3,637,459　　　　　　　　　　Dated　25 Jan. 1972

Inventor(s) Hal G. Parish, Albert J. Palfey, and Eugene R. Moore

It is certified that error appears in the above-identified patent and that said Letters Patent are hereby corrected as shown below:

In the names of the inventors, change "Palfrey" to --Palfey--.

Column 2, line 9, delete "to".

Column 4, line 25, change "flecition" to --deflection--.

Column 4, Table III, change the letter following "Polyurethane" under the column headed "180" from "P" to --F--.

Column 4, Table III, change the letter following "Paper honeycomb" under the column headed "180" from "P" to --F--.

Signed and sealed this 8th day of August 1972.

(SEAL)
Attest:

EDWARD M. FLETCHER, JR.　　　　ROBERT GOTTSCHALK
Attesting Officer　　　　　　　　Commissioner of Patents